(12) United States Patent
Wu et al.

(10) Patent No.: US 9,997,872 B2
(45) Date of Patent: Jun. 12, 2018

(54) CABLE CONNECTOR ASSEMBLY HAVING ALIGNED SOLDER TAILS FOR CONNECTING TO RESISTOR

(71) Applicant: FOXCONN INTERCONNECT TECHNOLOGY LIMITED, Grand Cayman (KY)

(72) Inventors: Jerry Wu, Irvine, CA (US); Jun Chen, Kunshan (CN); Fan-Bo Meng, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days. days.

(21) Appl. No.: 15/690,310

(22) Filed: Aug. 30, 2017

(65) Prior Publication Data
US 2018/0062324 A1    Mar. 1, 2018

(30) Foreign Application Priority Data

Aug. 30, 2016    (CN) .................... 2016 2 0967760 U

(51) Int. Cl.
| | | |
|---|---|---|
| H01R 13/66 | (2006.01) | |
| H01R 13/516 | (2006.01) | |
| H01R 24/60 | (2011.01) | |
| H01R 24/64 | (2011.01) | |
| H04L 12/40 | (2006.01) | |

(Continued)

(52) U.S. Cl.
CPC ....... *H01R 13/6616* (2013.01); *H01R 13/516* (2013.01); *H01R 13/6683* (2013.01); *H01R 13/6691* (2013.01); *H01R 24/30* (2013.01); *H01R 24/60* (2013.01); *H01R 24/64* (2013.01); *H01R 29/00* (2013.01); *H04L 12/40013* (2013.01); *H01R 2107/00* (2013.01); *H04L 12/40078* (2013.01)

(58) Field of Classification Search
CPC .... H01R 13/6616; H01R 24/64; H01R 24/30; H01R 13/6581; H01R 13/6585; H01R 24/60; H01R 13/516; H01R 13/6473; H01R 13/6691; H01R 13/6683; H01R 2107/00
USPC .................................................... 439/620.21
See application file for complete search history.

(56) References Cited

U.S. PATENT DOCUMENTS

| | | | | |
|---|---|---|---|---|
| 9,478,925 B2* | 10/2016 | Wu | ......................... | H01R 24/60 |
| 9,490,549 B2* | 11/2016 | Little | ..................... | H01R 4/023 |

(Continued)

FOREIGN PATENT DOCUMENTS

CN         105470688        4/2016

*Primary Examiner* — Jean F Duverne
(74) *Attorney, Agent, or Firm* — Wei Te Chung; Ming Chieh Chang

(57) ABSTRACT

A cable connector assembly (300) includes: a cable end connector (100) including an insulative support (21), plural contacts (22) insert molded with the insulative support, and a front insulative body (10) mounted to the insulative support, the plural contacts including a pair of USB 2.0 signal contacts (220), plural power contacts (221), plural ground contacts (222), and a detection contact (223), the plural power contacts having a solder tail (2211), plural ground contacts having a solder tail (2221), the detection contact having a solder tail (2230); and a cable (200) including a plurality of wires (201) directly connected to each of the two USB 2.0 signal contacts, one of the power contacts, and one of the ground contacts, respectively.

10 Claims, 8 Drawing Sheets

(51) Int. Cl.
    *H01R 29/00*     (2006.01)
    *H01R 24/30*     (2011.01)
    *H01R 107/00*     (2006.01)

(56) References Cited

U.S. PATENT DOCUMENTS

| | | | |
|---|---|---|---|
| 9,799,994 B2* | 10/2017 | Chen | H01R 13/6585 |
| 9,847,604 B2* | 12/2017 | Guo | H01R 13/6581 |
| 2008/0167828 A1 | 7/2008 | Terlizzi et al. | |
| 2011/0223807 A1* | 9/2011 | Jeon | H01R 13/6473 |
| | | | 439/620.22 |
| 2015/0106539 A1 | 4/2015 | Leinonen et al. | |
| 2015/0318646 A1 | 11/2015 | Little et al. | |
| 2015/0372429 A1 | 12/2015 | Lee et al. | |
| 2016/0276789 A1 | 9/2016 | Cheng et al. | |
| 2017/0005447 A1 | 1/2017 | Kim et al. | |
| 2017/0033513 A1 | 2/2017 | Bae et al. | |
| 2017/0033520 A1 | 2/2017 | Cheng et al. | |

* cited by examiner

CABLE CONNECTOR ASSEMBLY HAVING ALIGNED SOLDER TAILS FOR CONNECTING TO RESISTOR

BACKGROUND OF THE INVENTION

1. Field of the Invention

The present invention relates to a universal serial bus (USB) cable connector assembly having a physical resistor for use in determining its orientation of connection or its characteristics as connected between a host and a device.

2. Description of Related Arts

U.S. Patent Application Publication No. 2016/0276789 discloses a cable connector assembly that may be used in a USB Type C to USB Type B cable assembly or to Type A receptacle adaptor situation where a ground terminal soldering leg and a detection terminal soldering leg are soldered with a resistor. Or it may be used in a USB Type A to USB Type C cable assembly or a USB Type B receptacle to USB Type C adaptor situation where a power terminal soldering leg and a detection terminal soldering leg are soldered with a resistor.

U.S. Patent Application Publication No. 2015/0372429 discloses a resistor included in a cable connector assembly, i.e., either in Type C or Type A, or in an external apparatus connected through its cable.

U.S. Pat. No. 9,722,376 discloses a connecting device comprising a first connector having a first pin row, a second connector having a second pin row, a data line connecting a data pin of the first pin row and a data pin of the second pin row; and a recognition line connecting a power pin of the first pin row and a recognition pin of the second pin row through a physical element. The first connector may correspond to one of USB type A, USB type B, and USB type micro B; the second connector may correspond to USB type C. The physical element may comprise a resistor. The recognition pin may be a channel configuration (CC) pin based on USB 3.1 standard.

U.S. Patent Application Publication No. 2017/0033513 discloses a connecting device that may include a first connector, a second connector, a cable part between the first and second connectors, and a switching circuit connected to a recognition pin (e.g., a designated CC1 pin in the first connector). The switching circuit may include a switching part, a pull-down resistor, and a pull-up resistor.

An electrical connector having an improved arrangement of a physical resistor in a cable end connector of a USB cable connector assembly is desired.

SUMMARY OF THE INVENTION

A cable connector assembly comprises: a cable end connector including an insulative support, a plurality of contacts insert molded with the insulative support, and a front insulative body mounted to the insulative support, the plurality of contacts including a pair of USB 2.0 signal contacts, plural power contacts, plural ground contacts, and a detection contact, the plural power contacts having a solder tail, plural ground contacts having a solder tail, the detection contact having a solder tail; and a cable including a plurality of wires directly connected to each of the two USB 2.0 signal contacts, one of the power contacts, and one of the ground contacts, respectively; wherein the solder tail of the plural power contacts, the solder tail of the detection contact, and the solder tail of the plural ground contacts are aligned in a vertical direction; and a resistor is disposed between the solder tail of the plural power contacts and the solder tail of the detection contact, or between the solder tail of the detection contact and the solder tail of the plural ground contacts.

DETAILED DESCRIPTION OF THE PREFERRED EMBODIMENT

Figure 1:
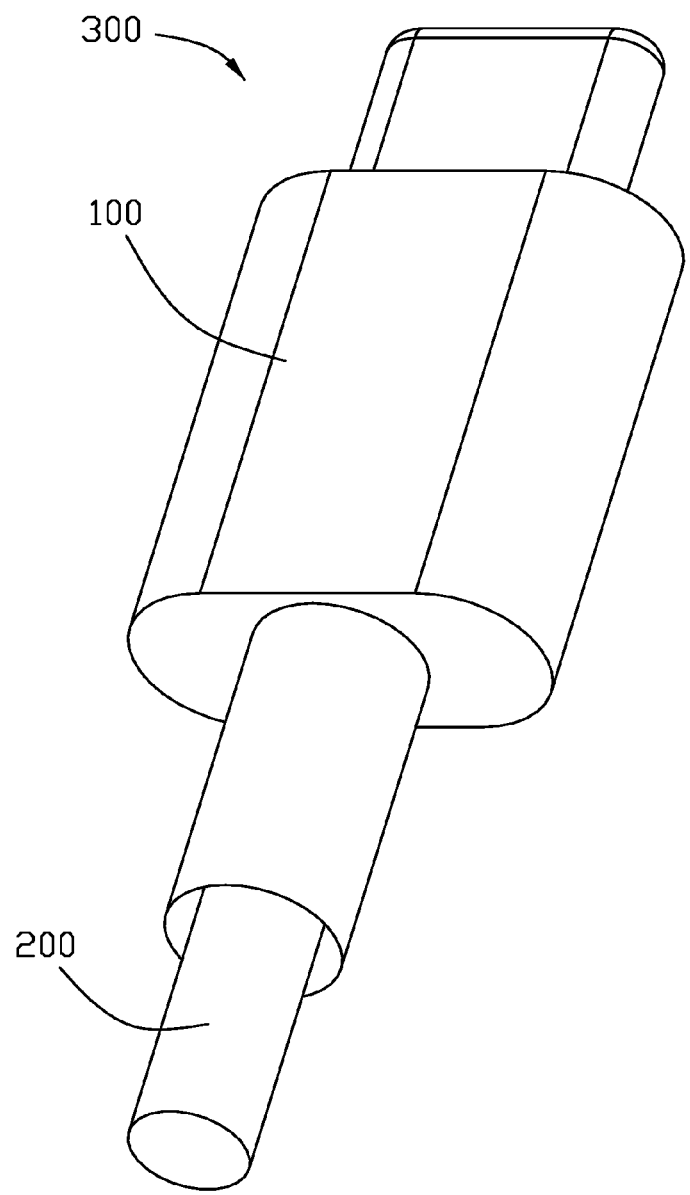
FIG. 1 is a perspective view of a cable connector assembly in accordance with the present invention.

As shown in FIG. 1, a cable connector assembly 300 includes a cable end connector 100 capable of mating in dual orientations and a cable 200.

Figure 2:
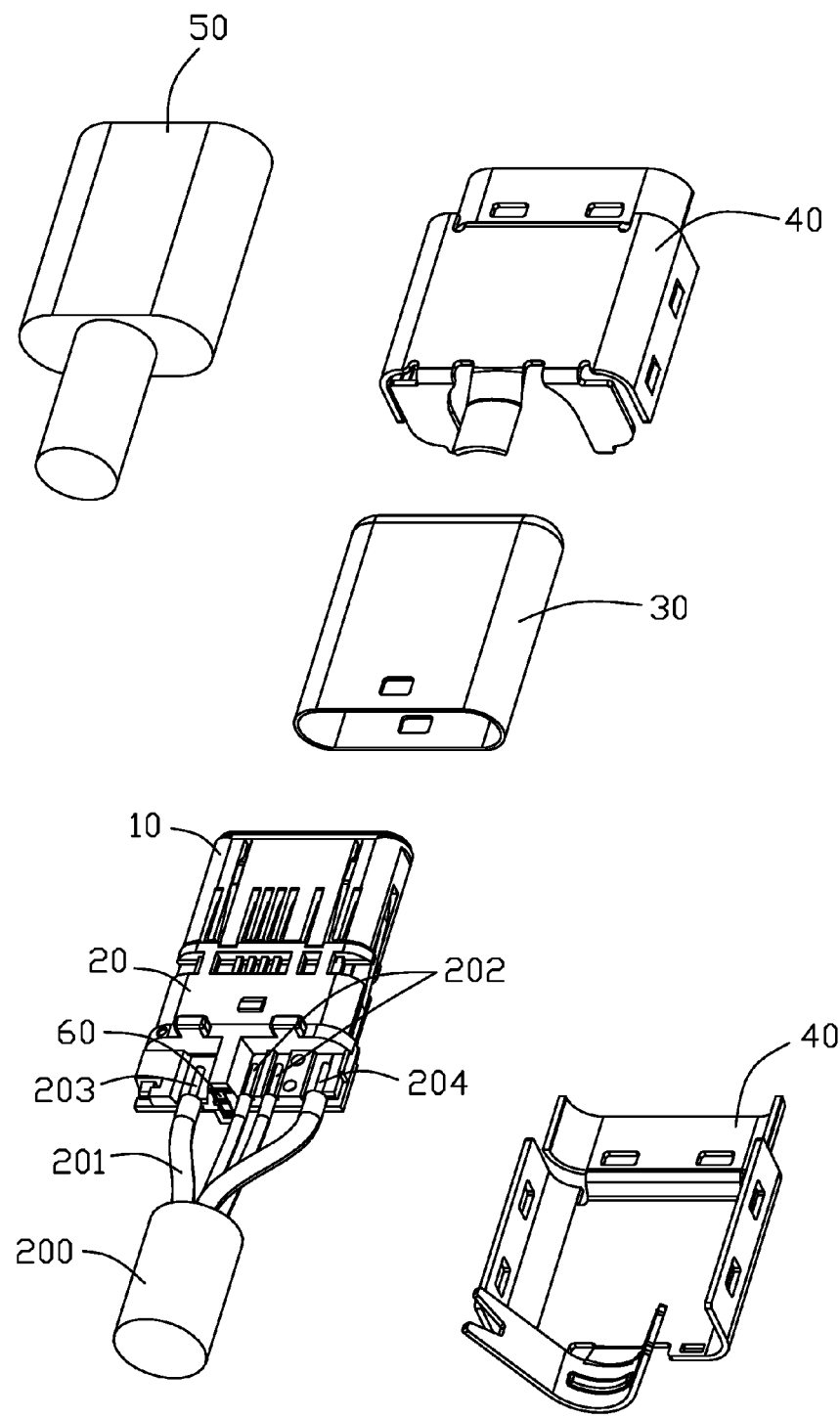
FIG. 2 is an exploded view of the cable connector assembly.
Figure 3:
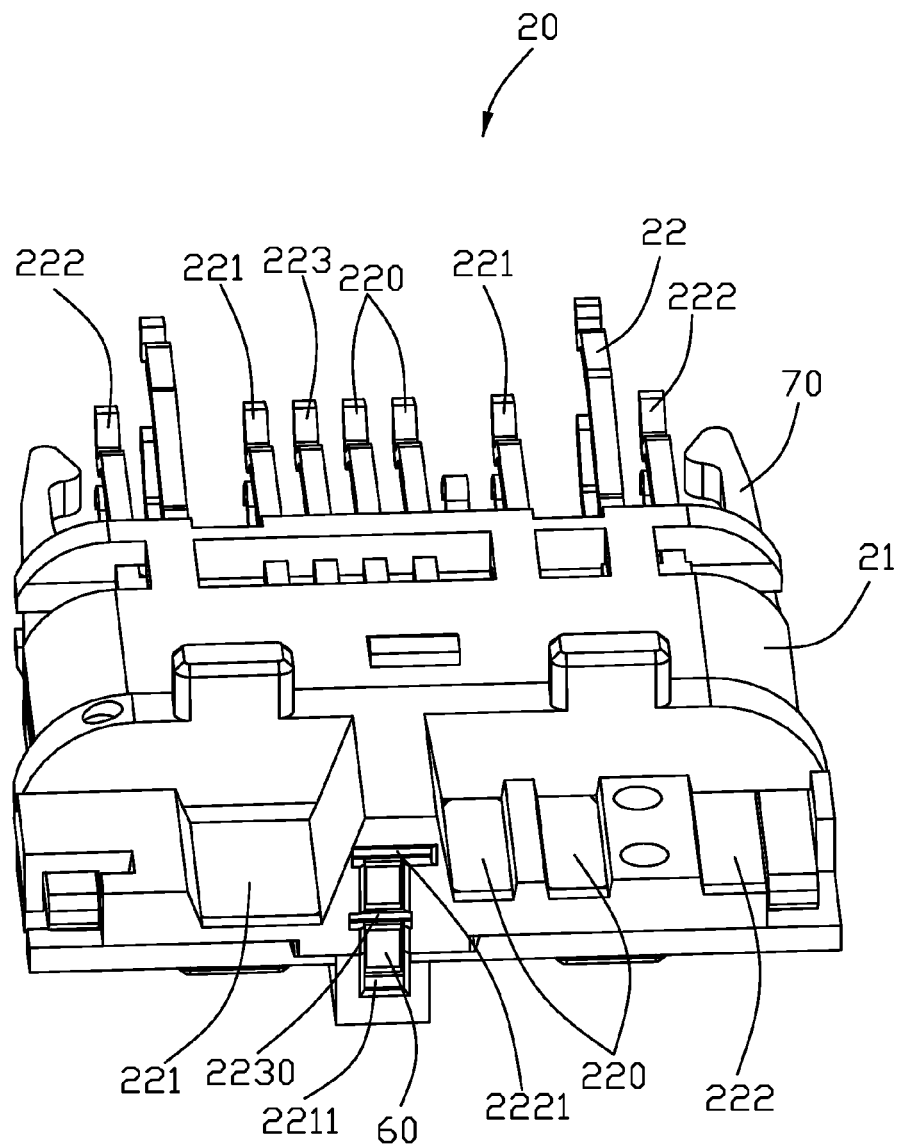
FIG. 3 is a perspective view of a terminal module of the cable connector assembly.

Referring to FIGS. 2-3, the cable end connector 100 includes a front insulative body 10 and a terminal module 20 mounted to the front insulative body 10. A resistor 60 is disposed between selected contacts, as will be detailed later. The cable end connector 100 may further include a metal shell 30 enclosing the insulative body 10, a shielding shell 40 enclosing the terminal module 20 and fastened to the cable 200, and an over-mold 50. The cable 200 includes a plurality of wires 201, namely, two signal wires 202, one power wire 203, and one ground wire 204.

Figure 4:
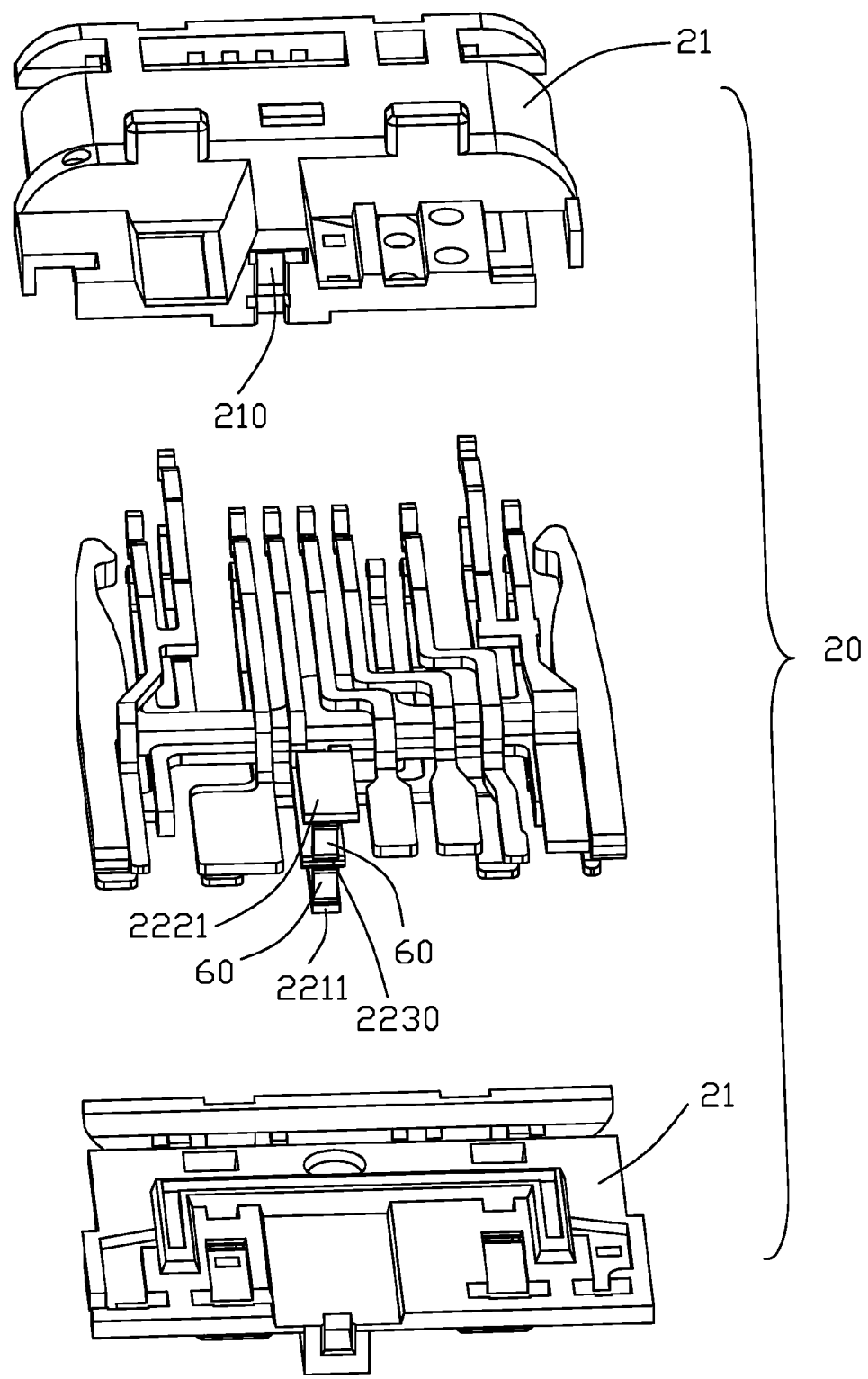
FIG. 4 is an exploded view of the terminal module.
Figure 5:
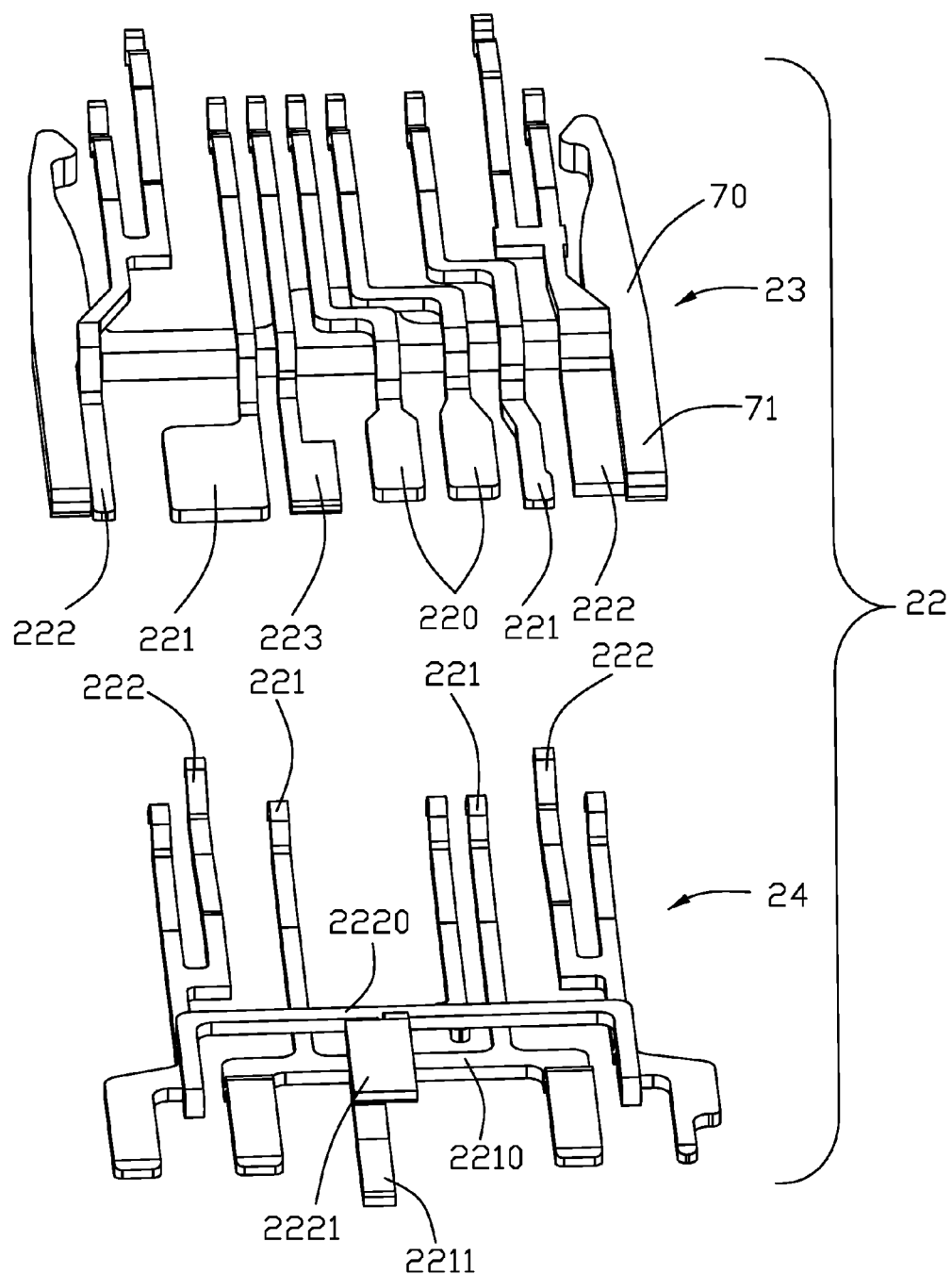
FIG. 5 is a perspective view of a plurality of contacts of the terminal module.

Referring to FIGS. 4-5, the terminal module 20 includes an insulative support 21 and a plurality of contacts 22 insert molded with the insulative support 21. The plurality of contacts include a pair of USB 2.0 signal contacts 220, plural power contacts 221, plural ground contacts 222, and a detection contact 223. The contacts 22 are arranged in two rows, namely, an upper row 23 and a lower row 24. The lower contact row 24 includes ground contacts 222 connected by a cross-beam 2220 which extends rearward to form a solder tail 2221 and power contacts 221 connected by a cross-beam 2210 which extends rearward to form a solder tail 2211. The detection contact 223 has a solder tail 2230.

The insulative support 21 includes an upper part associated with the contacts 22 in the upper row as the upper terminal module, and a lower part associated with the contacts in the lower row as the lower terminal module, and includes a slot 210 which the power solder tail 2211, the ground solder tail 2221, and the detection solder tail 2230 are exposed, spaced, and aligned in a vertical direction. In this embodiment, the lower part may be integrally formed with the lower contacts via a first stage insert-molding process and the upper part may be integrally formed with the upper contacts 22 via a second stage insert-molding process applied upon the first stage insert-molding process. The detection solder tail 2230 is positioned between the power solder tail 2211 and the ground solder tail 2221. The resistor 60 is received in the slot 210 and connected between the power solder tail 2211 and the detection solder tail 2230. Or, the resistor 60 is received in the slot 210 and connected between the ground solder tail 2221 and the detection solder tail 2230. It is known that a device, which operates in a host mode, may supply electric power to a device that operates in a device mode. Depending on what mode device the cable end connector 100 is connected to, the resistor may be 5.1 kΩ or 56 kΩ.

Figure 6:
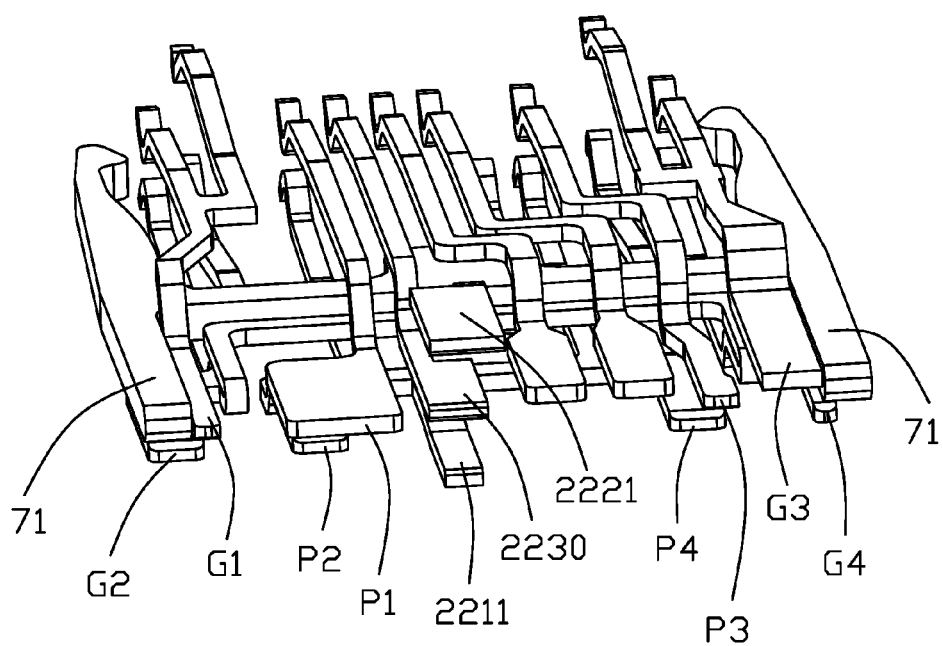
FIG. 6 is an assembled perspective view of the contacts and the latches 70 to show the structural relation thereamong.
Figure 7:
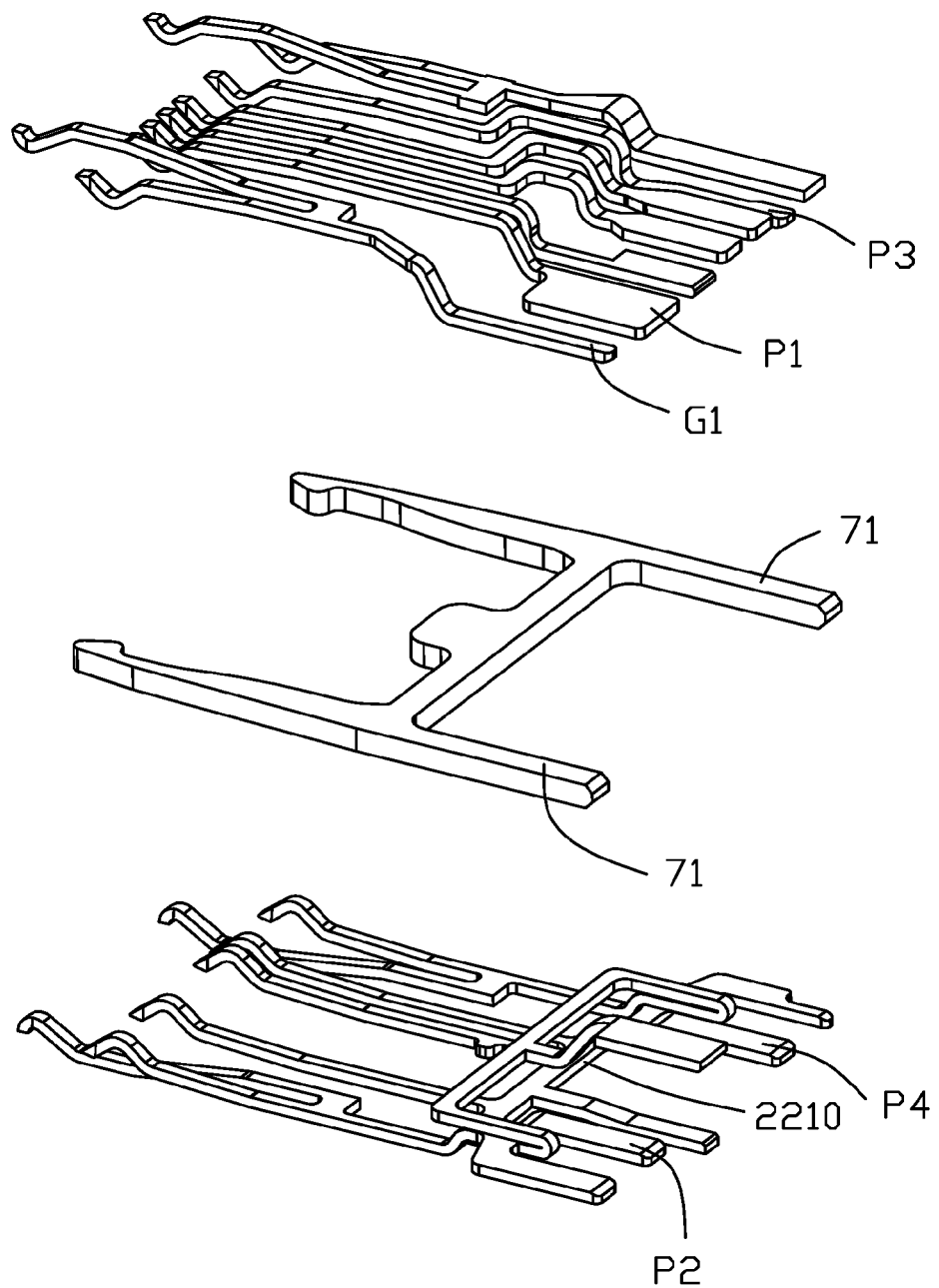
FIG. 7 is an exploded perspective view of the contacts and the latches 70 of FIG. 6.
Figure 8:
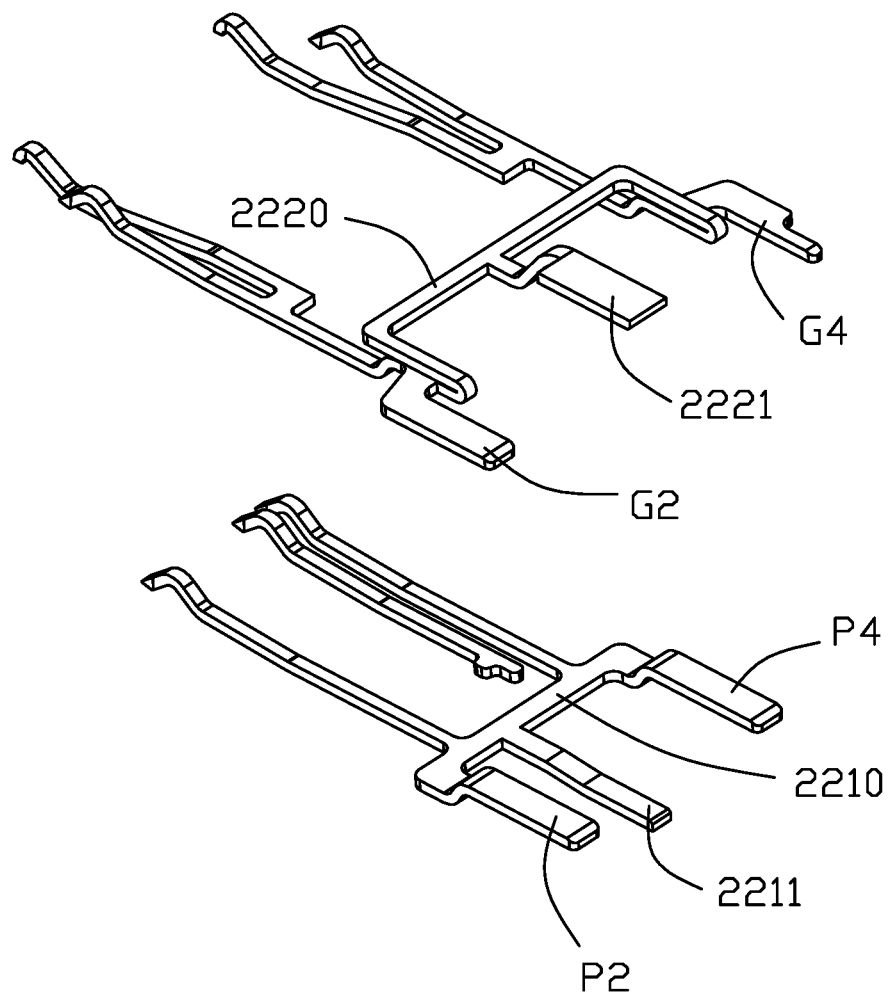
FIG. 8 is a further exploded perspective view of the contacts in the lower row to show the power contacts and the grounding contacts thereof.

The cable end connector 100 may further include a pair of latches 70 linked by a transverse bar (not labeled), each latch 70 having a respective tail 71 side-by-side in contact with a corresponding ground solder tail. The insulative support 21 has an upper surface exposing the solder tails of one power contact 221, the pair of signal contacts 220, and one ground contact 222 in the upper row, as shown in FIG. 3, for soldering directly to the power wire 203, the two signal wires 202, and the ground wire 204, respectively. Referring to FIGS. 6-8, all power contacts 221 in the upper and lower rows are electrically connected by the corresponding tail section P1 and P2, and P3 and P4 wherein tail sections P2 and P4 are further connected via the cross-beam 2210. Similarly, all ground contacts 222 in the upper and lower rows are electrically connected by the corresponding tail section G1 and G2, and G3 and G4 wherein tail section G1 not only directly contacts tail section G2 but also indirectly through the corresponding tail 71 of the latch 70, while the tail section G3 does not directly contact the tail section G4 but via the corresponding tail 71 of the latch 70 and via the cross-beam 2220. One feature of the invention is that the solder tail sections of the contacts and those of the latch are only exposed upon upper surface of the insulative support rather than two opposite surfaces for facilitating soldering process.

What is claimed is:

1. A cable connector assembly comprising:
    an insulative support;
    a plurality of upper contacts and a plurality of lower contacts arranged opposite to each other in a vertical direction, each of said upper contacts and said lower contacts extending along a front-to-back direction perpendicular to said vertical direction, the upper contacts including a pair of outer ground contacts and a pair of inner power contacts in a transverse direction perpendicular to both said vertical direction and said front-to-back direction, the lower contacts including a pair of outer ground contacts and a pair of inner power contacts in the transverse direction corresponding to the outer ground contacts and the inner power contacts of the upper contacts in said vertical direction, and one of said upper contacts and said lower contacts further including a detection contact;
    a first cross-beam linked between either the pair of outer ground contacts of the upper contacts or the pair of outer ground contacts of the lower contacts, and forming a first tail section;
    a second cross-beam linked between either the pair of inner power contacts of the upper contacts or the pair of inner power contacts of the lower contacts, and forming a second tail section; and
    a third tail section formed on the detention contact;
    wherein
    all said first tail section, said second tail section and said third tail section are located around a rear side of the insulative support, and at least one resistor is located either between the first tail section and the third tail section, or between the second tail section and the third tail section wherein said third tail section is located between the first tail section and the second tail section in the vertical direction; wherein two resistors are respectively disposed between the first tail section and the third tail section, and between the second tail section and the third tail section.

2. The cable connector assembly as claimed in claim 1, wherein a pair of tail sections of the pair of inner power contacts of the upper contacts respectively abut against a pair of tail sections of the pair of inner power contacts of the lower contacts.

3. The cable connector assembly as claimed in claim 1, wherein a pair of tail sections of the pair of outer ground contacts of the upper contacts electrically connect to a corresponding pair of outer ground contacts of the lower contacts either directly mechanically or indirectly via a latch which is essentially located between the upper contacts and the lower contacts in the vertical direction.

4. The cable connector assembly as claimed in claim 1, wherein a pair of tail sections of the pair of outer ground contacts of the upper contacts electrically connect to a corresponding pair of outer ground contacts of the lower contacts directly via a cross-beam structure.

5. The cable connector assembly as claimed in claim 1, wherein said first cross-beam extends in a folded manner.

6. The cable connector assembly as claimed in claim 1, wherein one of the pair of outer ground contacts of either the upper contacts or the lower contacts has a fourth tail section mechanically and electrically connected to a ground wire, and one of the pair of inner power contacts of either the upper contacts and the lower contacts has a fifth tail section mechanically and electrically connected to a power wire.

7. The cable connector assembly as claimed in claim 4, wherein both said fourth tail section and said fifth tail section are exposed upon a same side of the insulative support in the vertical direction.

8. A cable connector assembly comprising:
    an insulative support;
    a plurality of upper contacts and a plurality of lower contacts arranged opposite to each other in a vertical direction, each of said upper contacts and said lower contacts extending along a front-to-back direction perpendicular to said vertical direction, the upper contacts including a pair of outer ground contacts and a pair of inner power contacts in a transverse direction perpendicular to both said vertical direction and said front-to-back direction, the lower contacts including a pair of outer ground contacts and a pair of inner power contacts in the transverse direction corresponding to the outer ground contacts and the inner power contacts of the upper contacts in said vertical direction, and one of said upper contacts and said lower contacts further including a detection contact;
    the pair of inner power contacts of the upper contacts and the pair of inner power contacts of the lower contacts being electrically unified together with a common first tail section;
    the pair of outer ground contacts of the upper contacts and the pair of outer ground contacts of the lower contacts being electrically unified together with a common second tail section;
    the detection contact forming a third tail section; wherein
    at least one resistor is disposed between either the first tail section and the third tail section, or between the second tail section and the third tail section wherein one of the pair of outer ground contacts of either the upper contacts or the lower contacts has a fourth tail section mechanically and electrically connected to a ground wire, and one of the pair of inner power contacts of either the upper contacts and the lower contacts has a fifth tail section mechanically and electrically connected to a power wire; wherein both said fourth tail section and said fifth tail section are exposed upon a same side of the insulative support in the vertical direction.

9. The cable connector assembly as claimed in claim 8, wherein two resistors are respectively disposed between the first tail section and the third tail section, and between the second tail section and the third tail section.

10. The cable connector assembly as claimed in claim 8, wherein two resistors are respectively disposed between the first tail section and the third tail section, and between the second tail section and the third tail section.

* * * * *